United States Patent [19]

Cannon et al.

[11] Patent Number: 5,247,166

[45] Date of Patent: Sep. 21, 1993

[54] FORM READER WITH LINEAR CCD SCANNER AND DRUM FEED

[75] Inventors: Thomas Cannon, Warwick; Daniel Smith, Cranston; Mark Bowen, N. Kingston, all of R.I.

[73] Assignee: Gtech Corporation, West Greenwich, R.I.

[21] Appl. No.: 902,549

[22] Filed: Jun. 22, 1992

Related U.S. Application Data

[63] Continuation of Ser. No. 710,353, May 31, 1991, abandoned.

[51] Int. Cl.[5] .............................................. H01J 40/14
[52] U.S. Cl. ................................ 250/208.1; 250/569; 235/462
[58] Field of Search ............... 250/556, 208.1, 566, 250/568, 569; 235/562, 563, 564, 565, 566; 358/482, 483

[56] References Cited

U.S. PATENT DOCUMENTS

| | | |
|---|---|---|
| 3,619,569 | 11/1971 | Hoehn et al. . |
| 3,777,165 | 12/1973 | Bryant et al. . |
| 3,886,328 | 5/1975 | Harms, Jr. et al. . |
| 4,070,584 | 1/1978 | Chartraire et al. . |
| 4,074,114 | 2/1978 | Dobras . |
| 4,147,928 | 4/1979 | Crean et al. . |
| 4,388,610 | 6/1983 | Tsunekawa . |
| 4,634,850 | 1/1987 | Pierce et al. ................... 235/462 |
| 4,724,307 | 2/1988 | Dutton et al. . |
| 4,738,441 | 4/1988 | Leonard . |
| 4,760,247 | 7/1988 | Keane et al. ................... 235/454 |

*Primary Examiner*—David C. Nelms
*Attorney, Agent, or Firm*—Eckert Seamans Cherin & Mellott

[57] ABSTRACT

A form reader especially for lottery forms with handwritten marks or bar codes includes a drum transport engaging the form, and a stepping motor advances the form circularly along a path around the drum, passing through a linear reading station elongated perpendicularly to the path. A light source illuminates the form at the read station and reflected light is incident on an elongated array of charge coupled device (CCD) light sensors via a focusing lens arrangement. An analog comparator coupled to a serial output of the CCD sensors digitizes encode and encodes each pixel in the elongated array repetitively during transport, sampling the reflectance of the form and defining an X-Y array of pixels. A digital processor coupled to an image memory analyzes the data for predetermined patterns such as handwritten marks, printed reference marks and/or printed bar code or OCR characters on the form. A throat sensor detects the form at an inlet to the reader for initiating operation of the stepping motor when the form is present. Form guides align the form generally to the transport path, and can be laterally movable for aligning one or both edges of the form to the transport path.

20 Claims, 3 Drawing Sheets

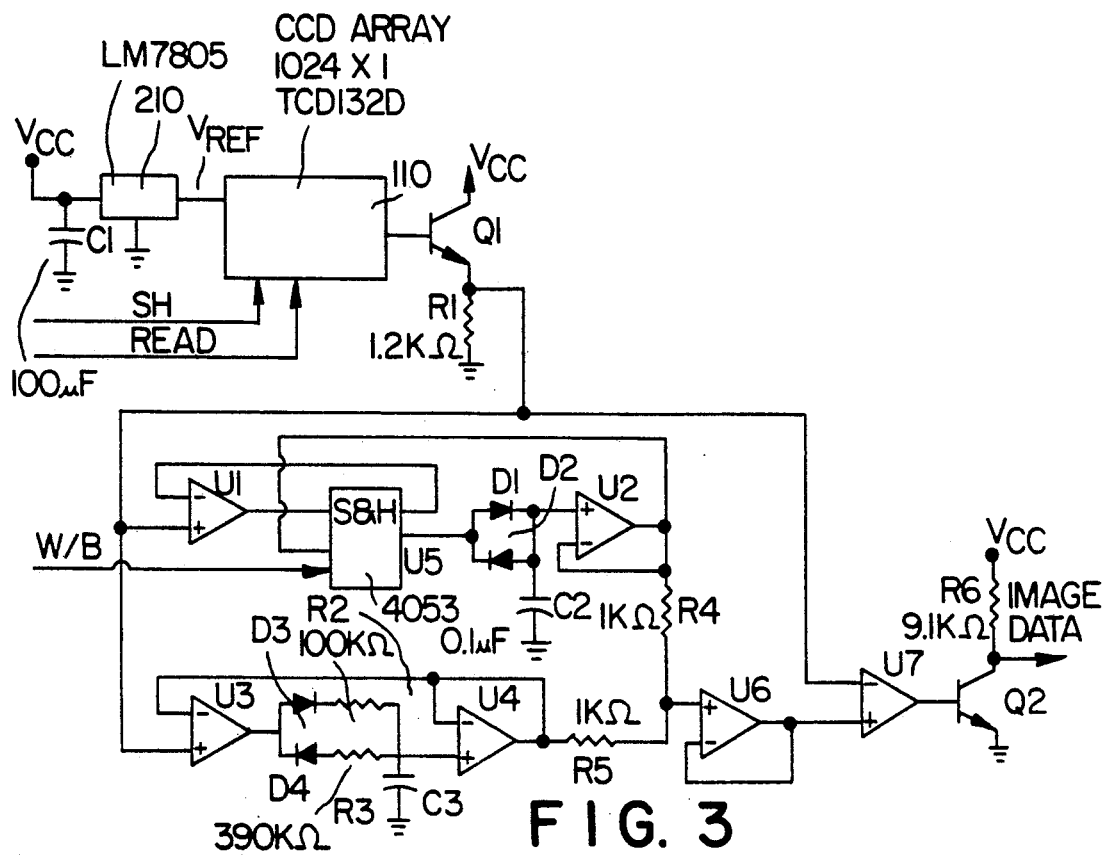
FIG. 3
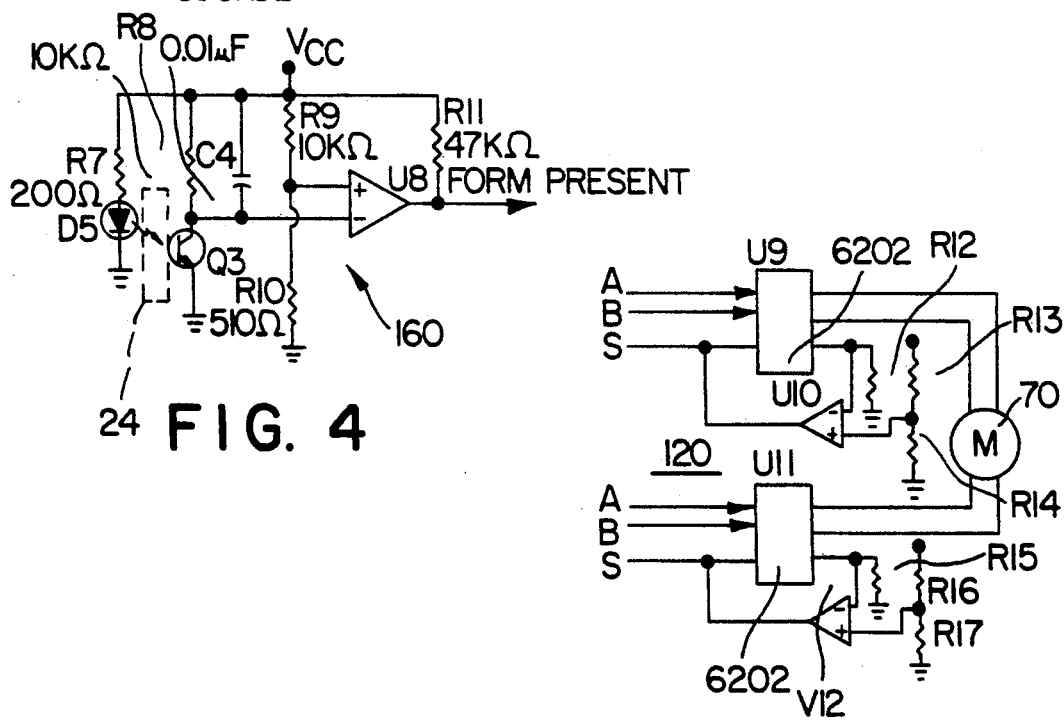
FIG. 4
FIG. 5

FORM READER WITH LINEAR CCD SCANNER AND DRUM FEED

This is a continuation of application Ser No. 710,353, filed May 31, 1991, now abandoned.

BACKGROUND OF THE INVENTION

1. Field of the Invention

This invention relates to the field of form readers, and in particular to a reader for discriminating information on manually marked forms such as lottery entry tickets as well as printed forms such as issued lottery entry validation tickets. The form is advanced by a drum feeder including a stepping motor, past an array of linearly arranged charge coupled device (CCD) light sensors. The outputs of the CCD light sensors are digitized for each step of the motor to obtain a two dimensional image of the form for analysis.

2. Prior Art

Forms for recording handwritten marks for entry of data into a data processing system generally have a plurality of discrete areas arranged in a pattern delineated by background printing on the form. The user indicates a choice by placing a line, an "X" or other mark (e.g., entirely filling in the area) in one of a series of areas presented for choice. Each of the areas is typically defined by a box, oval, pair of spaced lines, etc., and the form normally has a field for a number of such choices. Forms of this type are used for example to encode a lottery player's choice of numbers for a wager, using a form reader in data communication with a lottery agent terminal and with a central lottery computer.

Upon validation of a player's entry the lottery agent terminal prints an entry ticket showing the player's entry and a serial number or other unique identification. The unique identification may include printed alphanumeric characters as well as barcode, optical character recognition (OCR) characters and/or darkened blocks in a geometric pattern representing numeric data. If the player presents a printed ticket as a winning ticket, the lottery agent enters data from the ticket into the terminal for verification by the lottery central computer over the data communication link. This data can be read automatically in the same manner as a handwritten entry form, using an appropriate scanner.

Hand-marked forms are read automatically to determine whether a mark is present or absent in each of the areas presented for choice, normally in rows and columns. Printed forms are examined for the character of printed marks in a given field. The form is illuminated and the level of light reflected from the form is compared to a threshold level. For a row and column form a photocell can be oriented to read each of a number of rows of delineated areas or tracks. The level of reflected light along a track on the form is related in time or position to the pattern which was printed on the form to define the columns, such that a two dimensional array of marks (or missing marks) are determined to be present on the form. In order to correctly reference the position on the form with the level of reflected light and obtain meaningful data, the form must be properly positioned and fed such that either the rows or the columns are aligned to the sensing photocells, and the form is properly fed past the photocells such that by time or position the reflected light signals are accurately related to position on the form. Bar code scanners and OCR readers are similar in that the reflectance of the form in the area of interest is decoded to obtain information from the variations in darkness of the form.

Certain problems are encountered in attempting to obtain accurate data in a form reader, particularly at relatively higher speeds, due to the various parameters which may vary in the form and in the reading process. A form can be misaligned to the feeder; the handwritten or printed marks can vary in character and darkness; the illumination source can vary with aging; the printed delineations can vary in their position on the form; the card can flutter transversely as it is fed along its length, thereby varying the reflectance level due to changes in the distance between the marks and the sensors, etc.

To solve these and other problems, the prior art has provided a number of specific electric and mechanical means for handling the forms. To improve correlation of the signal to position on the form, for example, clocking marks can be printed on the form to trigger the threshold detector. To better respond to the light reflectance variations representing marks, the threshold level of the comparators can be varied adaptively. The form feeding apparatus can be made to high tolerance, and the forms can be printed to high tolerance in delineating the areas for potential marks. These procedures add to the cost and complexity of form production and form reading apparatus.

In U.S. Pat. No. 4,724,307—Dutton et al, an array of charge coupled devices (CCDs) is used to sample and hold a two dimensional representation of the reflectance level over the full face of a form. The form is illuminated at a read station. The reflected image is focused on a two dimensional array of discrete CCD sensors, and the image is parallel loaded into the CCDs all at one time, charging each of the CCD sensor elements to a level which represents the level of reflected light at a corresponding area of the form. The charge levels of the sensors are then read out and digitized, providing a pixel map or numerical representation of the image of the form.

The correlation of the sensor data to the presence or absence of marks includes finding reference marks in the image and searching the data for contrasting edges at predetermined positions in the two dimensional image relative to the reference marks. The individual CCD elements define picture elements (pixels) which are substantially smaller than the mark areas defined by printing on the form. By comparing several neighboring pixels, contrasting edges are detected notwithstanding variations in mark darkness. The processor need only search small areas of the image for the reference marks, and when located, the positions of the reference marks accurately define the positions of all expected marks delineated on the form by printing. Moreover, the mark positions need not define rows and columns.

The device is insensitive to many of the variations which make it difficult to read data in prior art form readers. Due to recording a freeze frame two dimensional image, the reader is insensitive to form feed variations such as variations in feed rate, form alignment and relative distance between the form and the source of illumination and/or the detection devices as occurs with form flutter.

However the form reader according to Dutton et al, as a practical matter, requires all the elements of a video camera to obtain the freeze frame image which is digitized and analyzed. The two dimensional CCD array and the associated optics for focusing the image of the full form on the CCD array make the apparatus relatively expensive compared for example to a line of photocells for each row or column. Moreover, either the form must be advanced to the read station and stopped, or strobed illumination is needed to prevent smearing of the image. These requirements further add to the expense of the reader, and to some extent make the reader less convenient for the user.

SUMMARY OF THE INVENTION

It is an aspect of the invention to obtain in a marked form reader the advantages of two dimensional pixel image data processing while reducing the expense of the reader.

It is a further aspect of the invention to improve the versatility of a form reader including an image processor to allow use with forms of various formats and sizes, and with handwritten as well as printed forms.

It is a further aspect of the invention to improve the convenience of a form reader for the user, in particular using a drum form transport which smoothly accepts a form from the user, reads the form during a continuous advancing motion, and returns the form smoothly to the user.

These and other aspects of the invention are found in a form reader especially for lottery forms with handwritten or printed marks. The form reader includes a drum transport engaging the form, and a stepping motor for advancing the form circularly along a path around the drum, passing through a linear reading station elongated perpendicular to the path. A light source such as a linear LED source illuminates the form at the read station and reflected light is focused on an elongated array of charge coupled device (CCD) light sensors. A comparator having a threshold based on the maximum and minimum detected light levels is used to digitize the pixels for each CCD light sensor at each step, thereby defining an X-Y array of light or dark pixels. The pixel data is captured in memory by a frame grabber which can be based on a programmable logic array circuit. A digital processor coupled to an image memory accesses the pixel data and analyzes the data for predetermined patterns, namely handwritten marks, printed reference marks, bar code, etc. A throat sensor detects the form at an inlet to the reader for initiating operation of the stepping motor when the form is present. Form guides align the form generally to the transport path, and can be laterally movable for different form sizes, aligning one or both edges of the form to the transport path.

BRIEF DESCRIPTION OF THE DRAWINGS

The invention is discussed herein with reference to exemplary embodiments which incorporate the elements of the invention; however, the device is capable of embodiment in other particular arrangements within the scope of the invention as disclosed and claimed. In the drawings.

FIG. 3 is a schematic diagram showing the CCD chip and the comparison of pixel analog levels to reference white and black levels;

FIG. 4 is a schematic diagram showing the generation of the form-present signal;

FIG. 5 is a block diagram showing the stepping motor drive arrangement; and,

DETAILED DESCRIPTION OF THE PREFERRED EMBODIMENTS

Figure 1:
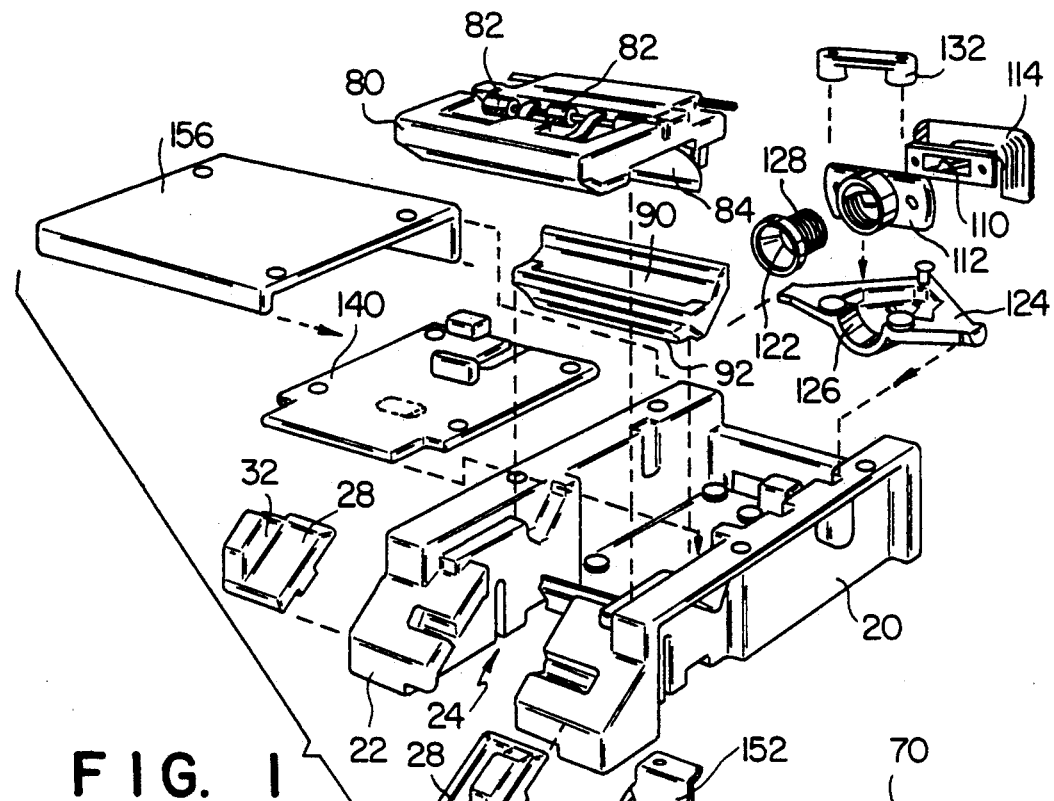
FIG. 1 is an exploded perspective view showing the physical elements and general mounting arrangement according to the invention.
Figure 2:
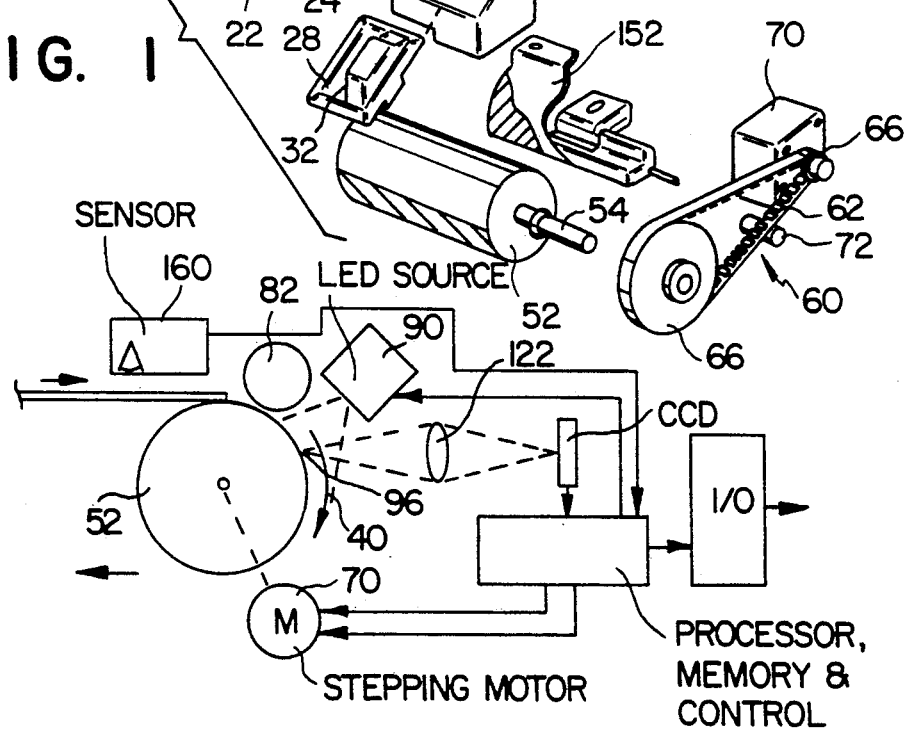
FIG. 2 is a functional block diagram showing the operation of the reader according to FIG. 1.

The form reader of the invention as shown in exploded view in FIG. 1, and in functional block form in FIG. 2, can be a modular element which is either fittable in a casing or incorporated in the casing of a larger terminal such as the casing of a lottery agent terminal. The reader includes a chassis 20 for mounting the parts relative to one another and to the casing. Adjacent the front 22 of the chassis 20, which is accessible to the lottery agent or other user, a throat opening 24 is defined, having a width sufficient for the widest form to be processed. For lottery entry tickets and validated entry tickets, a width of 3.25 to 4.5 inches (8.3 to 11.5 cm) is appropriate. Lateral guides 28 having barriers 32 are disposed along the edges of the form transport path 40 such that a form can be placed in the throat opening 24 with one edge against a guide 28 or with the form guided at both opposite edges by the barriers 32 of two opposed spaced guides 28. This assists in aligning the form to the transport path 40.

The form need not be aligned exactly accurately if reference marks are included whereby the data can be remapped in view of the detected locations of the reference marks. Such a procedure is discussed in connection with a freeze frame image processor in U.S. Pat. No. 4,724,307—Dutton et al, which is hereby incorporated. The remapped data allows processing of a precisely fed card in a virtual sense even if the form is not fed precisely parallel to the transport path.

At least one of the guides 28 is movable laterally (preferably both guides) for setting the width of the inlet or throat opening 24, and keeping the form within certain limits of correct alignment. The guides 28 can be slidably mounted on a slot at the front 22 of the reader for this purpose.

From the throat or inlet opening 24, transport path 40 leads immediately to a transport drum 52, which is relatively large compared to the form, for example about 2.5 inches (6.3 cm) in diameter. The drum can have a frictional surface for better engaging the form. The form is held against the drum 52 during transport, and is thereby kept from fluttering in a manner characteristic of forms fed edgewise in a slot. Drum 52 is rigidly coupled to a shaft 54, which is in turn coupled to drive assembly 60. A toothed belt 62 engages with splined pulleys 66, 66, coupled respectively to the shaft 54 of drum 52 and to the shaft of a stepping motor 70. An idler pulley 72 keeps the belt 62 taut and together with the stepping motor 70 ensures that the drum 52 is driven positively by the drive assembly for advancing the form in a regular manner stepwise along the transport path 40.

Stepping motor 70 of drive assembly 60 is controlled by a motor drive circuit 120 (see FIG. 5) to advance the form in steps around the transport path 40, synchronously with collection of image data from the form. The motor drive means is activated to move the form around the drum 52 when triggered by a form-in-position sensor 140 (see FIG. 3) including a paired LED and photosensor which are arranged to reflect on the form or are disposed across the transport path such that the light from the LED is interrupted by the form at the inlet or throat opening 24.

Top guide assembly 80 keeps the form in positive contact with the transport drum 52. The top guide assembly 80 includes idler rollers 82 and an arcuate cowling 84, which are resiliently mounted to bear against the form in the direction of transport drum 52, for holding the form against the drum 52, causing the form to remain fixed on the surface of the drum as it steps. The drum 52 and top guide assembly 80 move the form into position under an illuminating means 90 including LED assembly 92, which has a plurality of light sources disposed across the transport path, for illuminating an area of the form at the rear of the drum 52, elongated in a direction perpendicular to the transport path 40. The LED illumination source 92 can illuminate the form in a color which is complementary to any printing on the form which is to be ignored, for example red light to ignore green printing, etc. Preferably the reader is arranged to detect handwritten marks in pencil or pen, as well as black, blue or purple printing on the form. The light from the LEDs is generally directed downwardly and is inclined to illuminate the form on a rear facing read area 96, immediately below the illumination assembly 90.

Toward the rear of the chassis 20, an integrated circuit CCD array 110 is mounted on a holder 112, at the focus of a lens 122 carried in lens assembly 120. The lens assembly 120 has an alignment base 124 with a depression 126 for mounting a lens barrel 128, and a clamp 132 which holds the lens in place to focus a linear image of the illuminated portion of the form in the read area 96 onto the CCD sensor array 110. The CCD sensor array 110 is preferably a single line array of $1,024 \times 1$ sensor elements, for example part no TCD132D, and is coupled by a flexible cable 114 to a printed circuit card 140 mounted in the chassis 20 and carrying circuitry for servicing the CCD sensor element.

As the CCD elements in the array 110 are exposed to light, a charge accumulates in each at a rate which is a function of the degree of illumination of the CCD element, i.e., depending on the reflectance of light from source 92 from that portion of the form whose image is focused on the particular CCD element. The voltages of the sensor elements in the array are read out serially and compared to a threshold in order to digitize the image into light and dark areas for spatial analysis.

The form is advanced by a stepping operation of motor 70, for example one step per sample or line of pixels. The motor 70 can dwell between steps to allow charge to accumulate in the CCD sensor elements. The sensor array 110 and lens 122 can be placed so as to read across the entire width of the form, or only so much of the width as includes an area bearing marks to be detected. As the form advances past the read station 96, the leading edge of the form passes under a lower guide assembly 152, which guides the form outwardly, back through the throat opening 24 or through a lower opening in a bezel defining an upper inlet and lower outlet. The reading procedure is completed in a relatively short time, each form being processed in one or two seconds.

The chassis 20 and it contents can be a stand-alone unit, but preferably are included as a module of a larger terminal. The chassis is covered by shroud 156 to minimize accumulation of dust. In the event the device is embodied as a stand-alone unit, appropriate power supplies are required. Preferably, however, suitable connectors for data communications and power supply are provided at an easily accessible area of the chassis such that the apparatus can be simply mounted in or on a terminal which will further process the data read on the card, with power supplied from the terminal to the reader apparatus.

FIG. 3 illustrates the circuitry associated with the detection of light by the CCD array, and converting the pixel data into bits for storage and processing. The CCD array is preferably coupled to a regulated supply voltage defining a reference voltage level $V_{REF}$, for example from series regulator 210, rendering the sensor array insensitive to supply variations at voltage $V_{CC}$. A filter capacitor C1 further decouples the power supply. The CCD array includes inputs coupled to control devices operable activate the CCD array in synchronism with the operation of the stepping motor 70, i.e., during dwells. The CCD is cleared to prepare for collection of pixel data for a given line. When the stepping motor dwells after a step, the CCD array 110 accumulates charge in its sensor elements, which preferably define a linear array. After a predetermined time, the accumulated charges are clocked out sequentially to an output coupled to the base of transistor Q1, which forms an emitter follower with resistor R1. The inputs to the CCD array are generally indicated as "READ" and "SHIFT", and select among the clearing, charge accumulating and output modes of the device.

The analog signal on the base of transistor Q1 is coupled to two stages defined respectively by operational amplifiers U1–U5 and U3–U6, and also to the inverting input of op amp U7. The first of the two stages includes a sample and hold circuit U5 coupled in a follower arrangement to op amp U1. Oppositely biased diodes D1, D2 and capacitor C2 at the output of U5 form a peak detector. Similarly, in the second of the stages, the output of op amp U3 is coupled to a peak detector provided by oppositely biased diodes D3, D4 and capacitor C3, with resistors R2 and R3 in series with the diodes. The output of the second stage is coupled to a follower amplifier in U4 and the output of the first stage is coupled to a follower amplifier in U2. The outputs of U2 and U4 define dark and light peak levels, and are coupled to a further follower amplifier U6 through series resistors R4 and R5, so as to average the high and low peaks. The dark level is in reality the ideal level from the CCD device and not that which may be imaged and processed through the CCD. The output of follower U6 provides a reference input to comparator U7, which distinguishes whether a given pixel voltage is interpreted to be dark or light. The output of comparator U7 is coupled to the base of driver transistor Q2, the collector of which is coupled to the power supply voltage $V_{CC}$ through resistor R6, and defines the image data output, i.e., a digital pulse train during unloading of the CCD sensors, corresponding to lines of pixels which were charged over or under the reference level defined by the average of the high and low peaks.

Operation of the CCD sensor is synchronized to stepping of drum 52 via stepping motor 70, which commences when a form is detecting in the inlet opening 24 of the reader. FIG. 4 shows an exemplary form-in-place sensor 160, having a paired light source and photosensor such as LED D5 and phototransistor Q3. The source D5 and detector Q3 can be located on opposite sides of the form transport path 40 at the inlet 24 to the reader, or can be arranged on the same side so as to reflect off a form. LED D5 is powered through resistor R7. Phototransistor Q3 conducts when receiving light, such that the voltage at the junction of the collector of Q3 and resistor R8 falls. The signal is decoupled relative to the positive supply by capacitor C4, and coupled to one input of comparator U8. The other input of comparator U8 defines a reference voltage via the voltage divider of resistors R9 and R10. Resistor R11 pulls up the output of the comparator, which is high true.

The stepping motor 70 is a multiple pole motor driven by high current drivers U9 and U11 in a known manner based upon inputs at their respective inputs A, B. Sense outputs of drivers U9, U11 are coupled to comparators U10 and U12, and compared to references voltages generated by voltage dividers R13–R14 and R16–R17.

Figure 6:
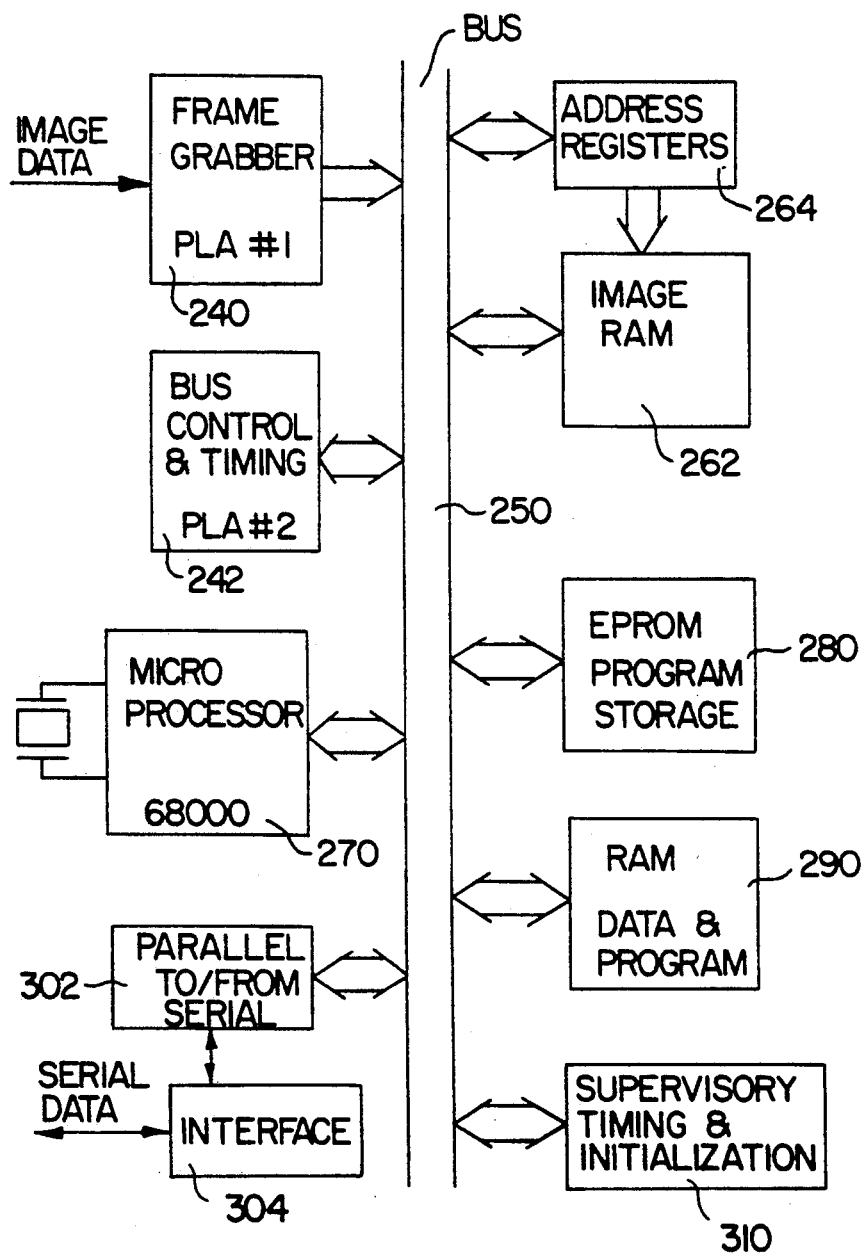
FIG. 6 is a block diagram showing image and data memories, the bus and bus controller, and microprocessor for image data analysis and for communication of the results.

Operation of the CCD sensor and the stepping motor are synchronized using a number of timing and control elements as shown in FIG. 6 in block diagram form. A first programmable logic array 240, for example Xilinx model XC2018-68PLCC, is arranged to collect and store the digitized pixel data from the image data output at the collector of transistor Q2 (see FIG. 3). The data is stored in a random access image memory 262, via communications across a sixteen bit bus 250. The first logic array 240 also provides the motor enable outputs A,B for each of the high current drivers U10, U11 for the stepping motor, and the signals for clearing, reading and shifting the CCD sensor array 110. A second programmable logic array 242 provides timing signals for synchronizing operation and in conjunction with address registers 264 also handles bus address decoding and control functions necessary for bus arbitration. The image RAM 262 preferably has sufficient storage for a full X-Y array of pixels on at least one form, and can have storage sufficient for more than one form.

The data in the image RAM 262 is accessible over bus 250 to microprocessor 270, which is programmed to analyze the pixel data. The programming for microprocessor 270 is stored at least partly in nonvolatile storage at EPROM 280. Random access storage is also provided in RAM 290, which can be used for further program area, or for storage of data values. In the embodiment shown, the microprocessor 270, its operational memory elements 280, 290 and image memory 262 are all coupled to the same bus 250. It is also possible to provide separate busses for the image capture and control elements 240, 242, 264, 262, and for the data analysis and communication elements 270, 280, 290, with appropriate data paths for allowing the microprocessor access to the contents of image memory 262. Microprocessor 270 can be arranged to analyze pixel information in order to detect marks at predetermined locations, preferably as interpreted in connection with reference marks on the forms. Dark areas at predetermined locations corresponding to user choices are found by searching for contrasting edges at the locations, spanning a plurality of pixels. Barcode is discriminated by analyzing for the size and spacing of dark bands disposed perpendicular to a line which may be oriented in any predetermined direction and at any location on the form. OCR characters are discriminated by shape patterns at predetermined areas. In each case the markings on the form are interpreted as alphanumeric data or as choices of options, and are encoded digitally by the microprocessor. The output of the microprocessor, for example numerical data represented by handwritten marks at corresponding numbered locations, or numerical or alphabetical codes represented by printed barcode, OCR characters or the like, can be communicated over bidirectional parallel/serial converter 302 to a further apparatus such as a lottery agent terminal in which the reader is disposed. The agent terminal conducts further communications with a central lottery computer for processing lottery entries, ticket validations, etc. The output and input can be standard format RS485, converted between digital logic levels and RS485 levels by I/O interface 304, which is disposed between the reader and the terminal.

A further supervisory element 310 is provided for accomplishing watchdog functions. Supervisory element 310 can include a power-up reset circuit, power fail detector and watchdog timer for resetting the apparatus in the event of a failure. Supervisory element 110 preferably also controls battery backup means coupled to the volatile memory elements, for maintaining their contents for a time after a power failure.

The invention is discussed with reference to the reading of lottery tickets and the like, but is also applicable to marked forms generally, including forms wherein selections are handwritten, or where a serial number or other indicia is printed on the form by machine.

According to the preferred embodiment the discrimination between light and dark pixels is accomplished using an analog voltage comparator, whereby the pixel levels are digitized to a single bit. This arrangement is inexpensive and effective, particular because the threshold level applied to the comparator is a function of the average of the light and ideal dark peaks. It is also possible to encode the pixel data using additional bits, thus defining gray levels. Depending on considerations such as processing speed and expense for additional memory storage capacity, the pixels can be encoded to only one bit or, using an analog to digital converter as the digitizer the pixels can be encoded for example to two, four or eight bits. The analog to digital converter is simply a threshold detector having a plurality of thresholds defining gray levels, and can be embodied in a manner similar to the one bit embodiment shown wherein the threshold is varied to accommodate variations in illumination, average reflectance and the like.

The invention having been disclosed, a number of additional variations within the scope of the invention will now become apparent to persons skilled in the art. Reference should be made to the appended claims rather than the foregoing discussion of exemplary embodiments, in order to asses the scope of exclusive rights in the invention claimed.

What is claimed is:

1. A reader for a form having reflectance variations representing data, comprising:
 a form transport including means for engaging the form, and a motor operable to advance the form along a transport path;
 illumination means operable to emit light against the form at a detection area;
 an array of charge coupled device (CCD) light sensors arranged relative to the detection area to detect light at discrete positions, the array being elongated in a direction at least partly perpendicular to the transport path;
 a digitizer operable to convert a level of charge from each said CCD light sensor to at least one digital bit, representing a sample of reflectance at the discrete positions;

means for triggering the CCD light sensors repetitively during transport of the form past the array of CCD light sensors, to sample said reflectance of the form at said discrete positions, thereby defining pixels in a two dimensional digital representation of an image of the form; and, a digital processor coupled to image memory means, operable to record and analyze the pixels for predetermined patterns.

2. The reader according to claim 1, wherein the predetermined patterns include reference marks and handwritten marks on the form, and wherein the digital processor is operable to reference position of the reference marks to determine presence and absence of the handwritten marks at particular positions on the form.

3. The reader according to claim 1, wherein the predetermined patterns include at least one of printed data, bar coded data and OCR characters, and wherein the digital processor is operable to discriminate the data by analyzing contrasting lines and spaces on the form.

4. The reader according to claim 3, wherein the digitizer includes an analog comparator having inputs coupled to at least one peak detector and to an output of the CCD sensors, the peak detector defining a reference level varying with at least one of a maximum and minimum signal level from the CCD sensors.

5. The reader according to claim 1, wherein the form transport includes a transport drum coupled to the motor, the transport drum carrying the form in a circular path.

6. The reader according to claim 5, wherein the motor is a stepping motor, and further comprising means for synchronizing stepping of the motor with triggering of the CCD sensors and the analog to digital converter.

7. The reader according to claim 6, wherein the CCD sensors define a linear array and the motor is stepped once for advancing the form from one image line on the form to a next image line on the form.

8. The reader according to claim 6, further comprising a throat sensor operable to detect presence of the form at an inlet to the reader, the throat sensor being coupled to the form transport for initiating operation of the motor when the form is present.

9. The reader according to claim 5, further comprising a form guide disposed at an inlet to the reader, the form guide being operable to align the form generally to the transport path.

10. The reader according to claim 9, wherein the form guide includes at least one laterally movable barrier, the barrier bearing against an edge of the form for generally aligning the form to the transport path.

11. The reader according to claim 10, wherein the form guide include two movable barriers for bearing against opposite edges of the form.

12. The reader according to claim 1, wherein the illumination means includes an elongated light bar arranged adjacent the transport path, and further comprising a lens disposed between the transport path and the CCD sensors, the lens focusing light reflected from the form onto the CCD sensors.

13. The reader according to claim 12, wherein the light bar includes a plurality of light emitting diodes in a linear array.

14. The reader according to claim 1, wherein the form is a lottery ticket including at least one of handwritten marks defining lottery entry data and printed marks identifying a previously validated lottery entry.

15. The reader according to claim 14, wherein the reader is coupled in data communication with at least one of a lottery agent terminal and a lottery central computer.

16. A reader for a lottery form having reflectance variations representing data, comprising:

a form transport including a drum transport for engaging the form, and a stepping motor operable to advance the form along a transport path passing circularly around the drum transport;

a linear light source operable to illuminate the form along a linear area substantially perpendicular to the transport path at a detection area;

an array of charge coupled device (CCD) light sensors and a lens arrangement, the CCD light sensors and the lens arrangement being positioned relative to the detection are to detect light reflected from the form at discrete positions, the array being elongated in a direction perpendicular to the transport path;

at least comparator coupled to an output of the CCD light sensors, operable to digitize a level of charge from each said CCD light sensor, representing a level of reflectance as compared to a reference level at a pixel corresponding to one of the discrete positions;

means for triggering the CCD light sensors and the comparator repetitively during transport of the form past the array of CCD light sensors, to sample said reflectance of the form at discrete positions defining pixels, providing a two dimensional digital representation of the pixels, the means for triggering the CCD light sensors and the comparator being synchronized with the stepping motor of the form transport; and, a digital processor coupled to image memory means, the processor being operable to analyze the pixels in the two dimensional digital representation for predetermined patterns including at least one of handwritten marks, printed marks, OCR characters and bar code on the form.

17. The reader according to claim 16, wherein the form includes reference marks for fixing a relative position of the marks on the form, the digital processor being operable to reference position of the reference marks to determine presence and absence of the handwritten marks at particular positions on the form.

18. The reader according to claim 16, further comprising a throat sensor operable to detect presence of the form at an inlet to the reader, the throat sensor being coupled to the form transport for initiating operation of the motor when the form is present.

19. The reader according to claim 16, further comprising a form guide disposed at an inlet to the reader, the form guide being operable to align the form generally to the transport path, and including at least one laterally movable barrier, the barrier bearing against an edge of the form for generally aligning the form to the transport path.

20. The reader according to claim 16, wherein the form is a lottery ticket including at least one of handwritten marks defining lottery entry data and printed marks identifying a previously validated lottery entry, and wherein the reader comprises means for data communication with at least one of a lottery agent terminal and a lottery central computer.

* * * * *